United States Patent Office 3,543,517
Patented Dec. 1, 1970

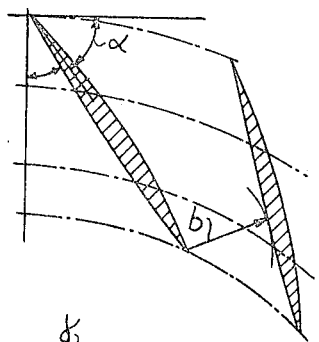
FIG. 2.
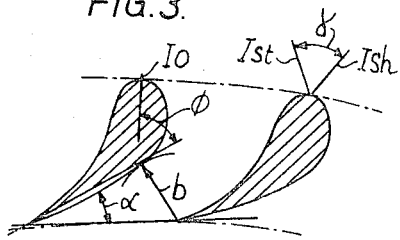
FIG. 3.
FIG. 4.
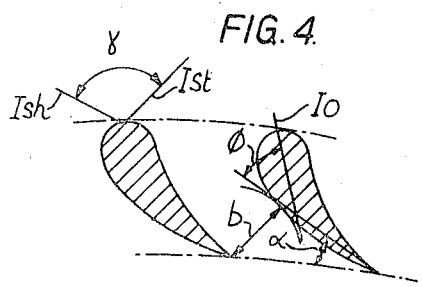
FIG. 5.
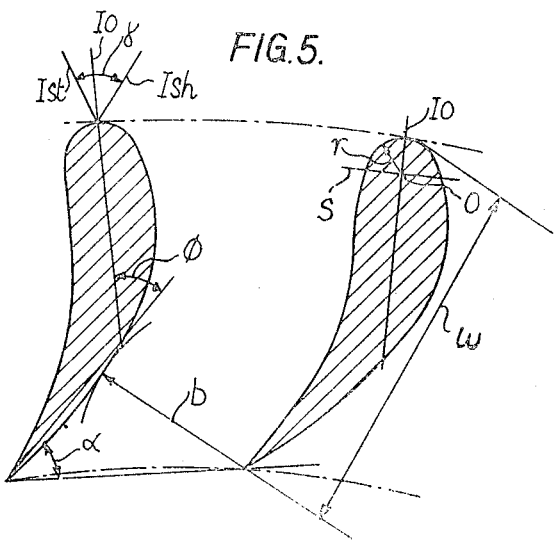

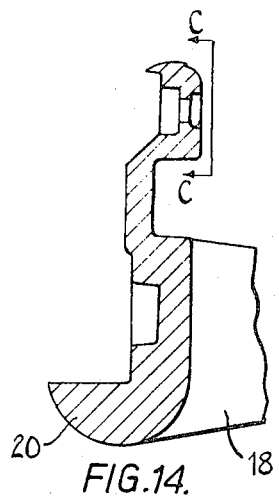
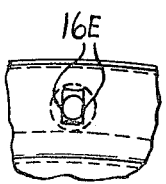
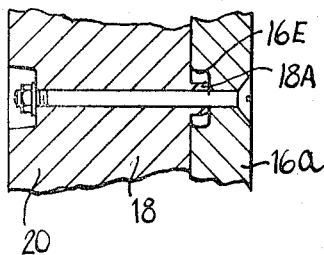
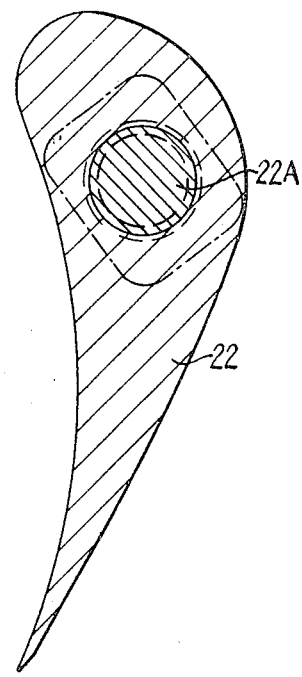

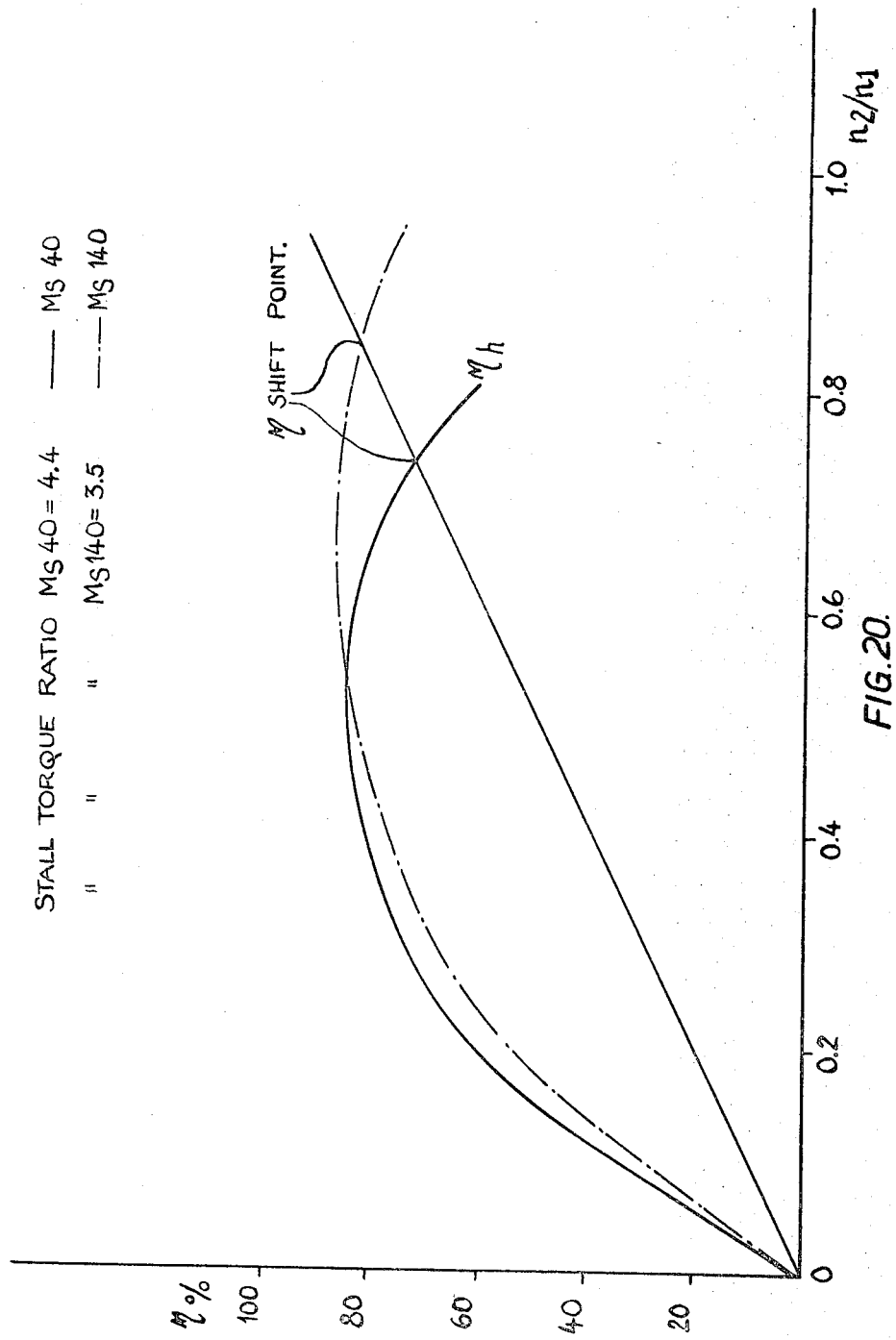

3,543,517
HYDRODYNAMIC TORQUE CONVERTERS
Karl Gustav Åhlén, Stockholm, Sweden, assignor to S.R.M. Hydromekanik AB, Stockholm-Vallingby, Sweden, a company of Sweden
Filed Jan. 13, 1969, Ser. No. 790,737
Claims priority, application Great Britain, Jan. 19, 1968, 3,124/68
Int. Cl. F16d 33/00
U.S. Cl. 60—54
20 Claims

ABSTRACT OF THE DISCLOSURE

A hydrodynamic torque converter having a closed hydraulic circuit, in which there is located a ring of pump blades, first and second rings of turbine blades and a ring of guide blades disposed between the rings of turbine blades. The turbine rings and the guide ring are positioned in the inflow section and the guide ring is positioned in the outflow section of the hydraulic circuit. The angle of deviation between the leading and trailing edges of the blades for the blades of the first turbine rings is 50° to 90° for a low Ms range of 40–80 and 75° to 115° for a high Ms range up to 140. The value of this angle for the guide ring is 25° to 50° for the said low and the said high Ms ranges, and value of this angle for the second turbine ring is 40° to 65° for the said low and the said high Ms ranges.

---

This invention relates to hydrodynamic torque converters.

Hydrodynamic torque converters today are very highly developed machines when considered both from the standpoint of performance and the standpoint of techniques used in their manufacture. One problem confronting engineers working in this field is the development of a torque converter transmission which is adaptable for a wide range of maximum HP-maximum input speed combinations thereby allowing the tooling costs involved to be spread over a maximum number of transmission applications. At the same time, the performance of the transmission must be maintained at a high level over the whole range of maximum HP-maximum input speed combinations required by the many different applications. The production of the blade system for a torque converter involves very high tooling costs, especially where the torque converters are required for automotive vehicles and, in such instances, owing to the continual aim to reduce overall costs, a reduction in manufacturing costs is greatly desired.

It is therefore an object of the present invention to provide a hydrodynamic torque converter transmission allowing a wider range of maximum HP-maximum input speed to be obtained than has been possible hitherto for each particular size of basic blade system. It is another object of the present invention to provide a basic blade system which, in itself, can be manufactured at a low cost without any undesirable loss in performance. To this end the blades of the system are principally two-dimensional because, although the blades taper, they are not twisted relative to the axes thereof in the way that an aircraft propeller blade is twisted and the cross-sectional shape of the blades taken in all planes normal to the major axis thereof conform to the same basic sectional shape. Such blades will be referred to herein as principally two-dimensional as herein defined. It is thus possible to adapt mass-production techniques in the manufacture of such a blade system as will become evident later.

Such a two-dimensional system is described in our United States Patents Nos. 2,690,053 and 2,690,054. The blade system described in these two patents, enables a high performance to be obtained for specific torque absorption or so called Ms factors between 40 and 80. We have now unexpectedly found, according to the present invention that a basic blade system can also be used for an Ms range up to 140. Thus, the range of 40 to 80 has been widened to 40 to 140. Expressed slightly differently, the same basic blade system may, by exchanging actual blade components, be utilised from, for example, 40 HP-input speed at 1,700 r.p.m. at shift point, up to 140 HP at 1,700 r.p.m. at shift point, or the same blade system may, by varying the blade components, be used for an input of 140 HP from 1,700 r.p.m. up to about 2,600 r.p.m. speed at shift point.

The last figures emphasize the weakness of a torque converter blade system in relation to a mechanical transmission, because the torque absorption of the torque converter varies with the second power of the speed and the power absorption with the third power of the speed whereas, if dynamic stresses and fatigue stresses are not taken into consideration, a mechanical transmission can transmit its design torque, independent of speed. To solve the problem outlined above, so-called "split torque systems" or "step-up gears" may be used which, in both cases, allows development of one single blade system with one Ms factor only, the step up gear or the split torque gear serving as an adaptor. Use of a step up gear makes the transmission expensive since it introduces torsional vibration problems necessitating special attention and special arrangements to absorb or dampen the vibrations. Consequently such systems are, generally speaking, confined to railway traction. For truck and earth moving equipment transmissions, the split torque arrangement has been more commonly used since it offers a simple solution to the adaptation problems associated with a direct drive. However, the best solution would be the use of one blade system which could be modified for use over a wide range of HP-input speed combinations, thus avoiding mechanical complications indicated above relating to a split torque system. If this could be achieved in a wider range than hitherto without making the production of torque converter components more costly a great contribution will have been made in the development of torque converter transmissions.

The torque absorption capacity of the blade system of a torque converter is defined in relation to a definition of the torque absorption under certain conditions for a particular or "norm" size of a torque converter. This torque absorption is referred to as Ms, that is the specific torque. The blade size for the "norm" is considered to be 1.0 and knowing the Ms value for the "norm" converter at a certain speed, the value of the torque absorption for any other converter at the same speed can be calculated having regard to the fact that the relationship of torque absorption for different sizes is that the torque varies with the fifth power of the size, for example, the size of the largest or outer diameter of the hydraulic circuit. To calculate the absorption torque at another speed due regard must be taken of the fact that the torque varies with the second power of the speed. The specific torque is the torque absorption of the blade system of the size accepted as the "norm" size 1.0 at an input speed of 1,700 r.p.m. and having a speed ratio such that the input and output torques are equal, that is, the "shift point." In this specification, where reference is made to an Ms value, the values are to be considered as relative values. Thus, a torque converter having an Ms 80 has a torque absorption which is twice as high as that for a torque converter having an Ms 40 and so on.

The present invention offers a very satisfactory solution to the above problems and, at the same time, retains the advantages of a torque converter according to our U.S. Pats. Nos. 2,690,053 and 2,690,054.

In order to attain the above objects and advantages the invention contemplates, the provision of a converter of the rotating casing type which for most applications and particularly automotive transmission installations requires not more than two turbine stages and in which the form of the hydraulic circuit and the form and the arrangement of the reaction or guide blades and the turbine blades makes possible performance characteristics of high stall torque ratio, high peak efficiency with a flat efficiency curve characteristic over a relatively wide range of speed ratios $n2/n1$ and high values of the ratio $n2/n1$ at the shift point. In this specification $n1$ represents the speed of the pump or primary member and $n2$ the speed of the turbine or secondary member. The invention in certain of its aspects also contemplates improved manufacturing techniques permitting a reduction in production costs in spite of high tooling costs which, owing to the wide field of application of the converters according to the invention, are readily absorbed.

The invention will now be described by way of example with reference to the accompanying drawings in which:

FIGS. 2 to 5 and FIGS. 6 to 9 are sections for low and high Ms range, respectively, taken on similarly numbered section lines of FIG. 1;

FIG. 14 is a section of the core element taken on line A—A of FIG. 13;

FIG. 15 is a section taken on line C—C of FIG. 14;

FIG. 16 shows a bolt connection for a second stage turbine blade;

FIG. 17 is a section of a first stage turbine blade to an enlarged scale;

FIG. 18 shows a spline connection between the second turbine and a shaft carrying same;

FIG. 20 shows performance curves obtainable for the low range or field $lf$ and the high range or field $hf$ of Ms values when the invention is applied to converters according to our earlier United States Pat. Nos. 2,690,053 and 2,690,054.

Figure 1:
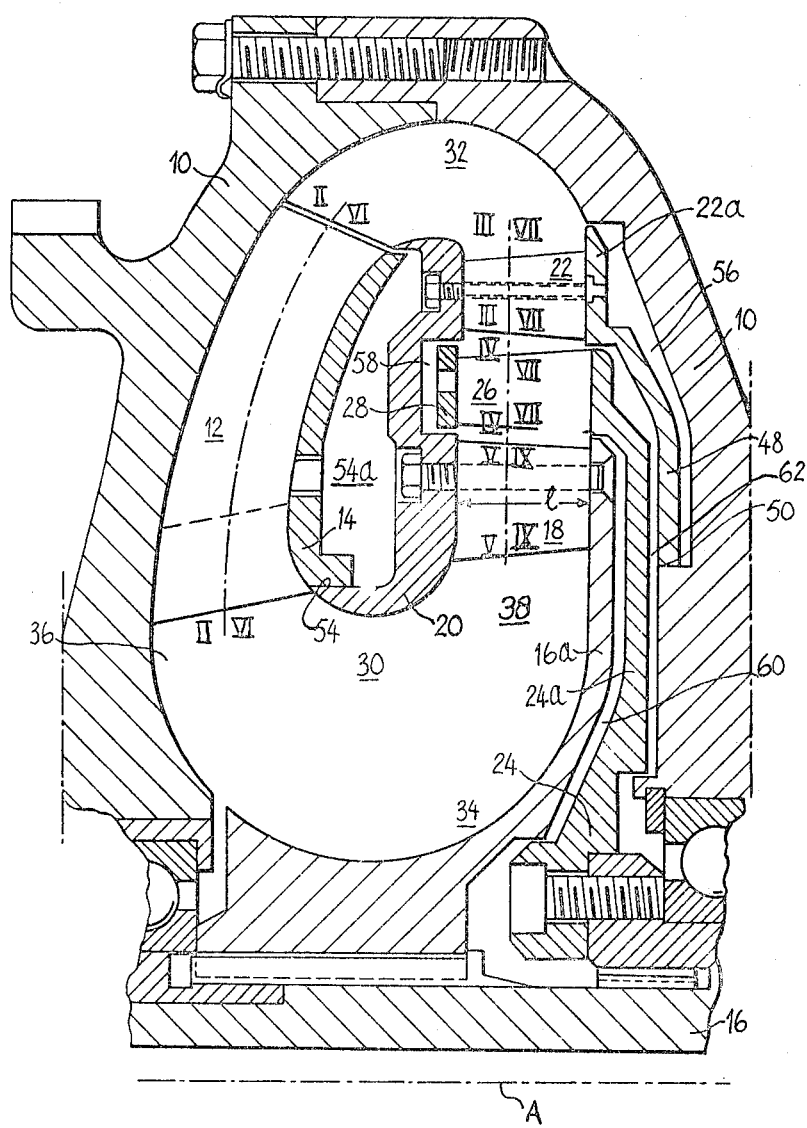
FIG. 1 is a diagrammatic longitudinal half-section of a converter according to the invention.

Referring to FIG. 1, the converter illustrated is of the rotating casing two stage type (see U.S. Pat. No. 2,690,054). The rotating casing 10 constitutes the primary member which is rotatable about an axis indicated at A. The casing 10 carries a ring of impeller or pump blades 12 which are connected to an inner core-ring element 14. The core-ring element 14 and a core element 20 are sealed at 54. A rotatably mounted secondary turbine member 16/16a carries a ring of second stage turbine blades 18, the inner ends of which are integral with the core element 20 which, together with the core-ring element 14, defines a chamber 54a. The core element 20 supports a ring of the first stage turbine blades 22 and these blades are additionally supported by a part 22a of a turbine extension 48. The extension 48 is separated from a member 24 by a space 62 and sealed against the casing 10 at 50. The extension 48 is also separated from the casing 10 by a space 56. The reaction member 24 may be fixed against rotation in either direction at all times. On the other hand the reaction member 24 may be mounted for rotation in either direction under certain conditions, and such converters (see U.S. Pat. No. 3,005,359) are commonly referred to as double rotation converters. The reaction member 24 may also be arranged to deliver power, when acting as a moving reaction member rotating in the same direction as that of the impeller member, or rotating in the same direction as that of the impeller but more slowly than the impeller and, under these conditions, the reaction member (see British Pat. No. 880,063) may function as a balancing impeller member. The reaction or guide member 24 carries a ring of reaction guide blades 26. These blades are connected at their inner ends by a ring element 28 which is spaced from the core at 58. As indicated, the turbine member 16a and the guide disc 24a are separated by a space 60. From FIG. 1 it will be seen that the core forming an inner perimeter of the cross section of the hydraulic circuit or path of flow 30 for the working fluid is formed by elements 14, 20 and 28 and the outer perimeter of this section of the circuit is formed by the casing 10, the turbine member flange 16a part of the reaction member 24 and the part 22a. Sections 32 and 34 of the hydraulic circuit are interconnected by sections 36 and 38.

Figure 10:
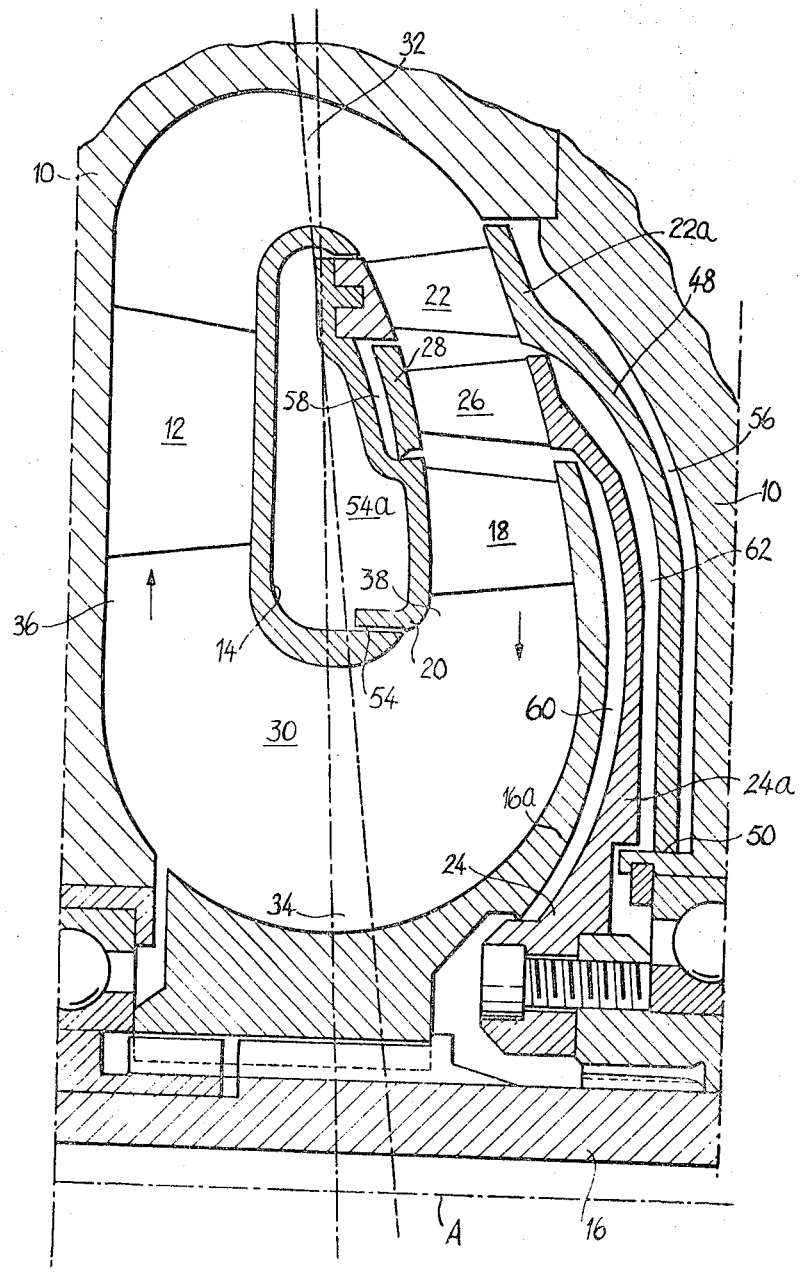
FIGS. 10, 11 and 12 are views similar to FIG. 1, showing other forms of converters according to the invention.
Figure 11:
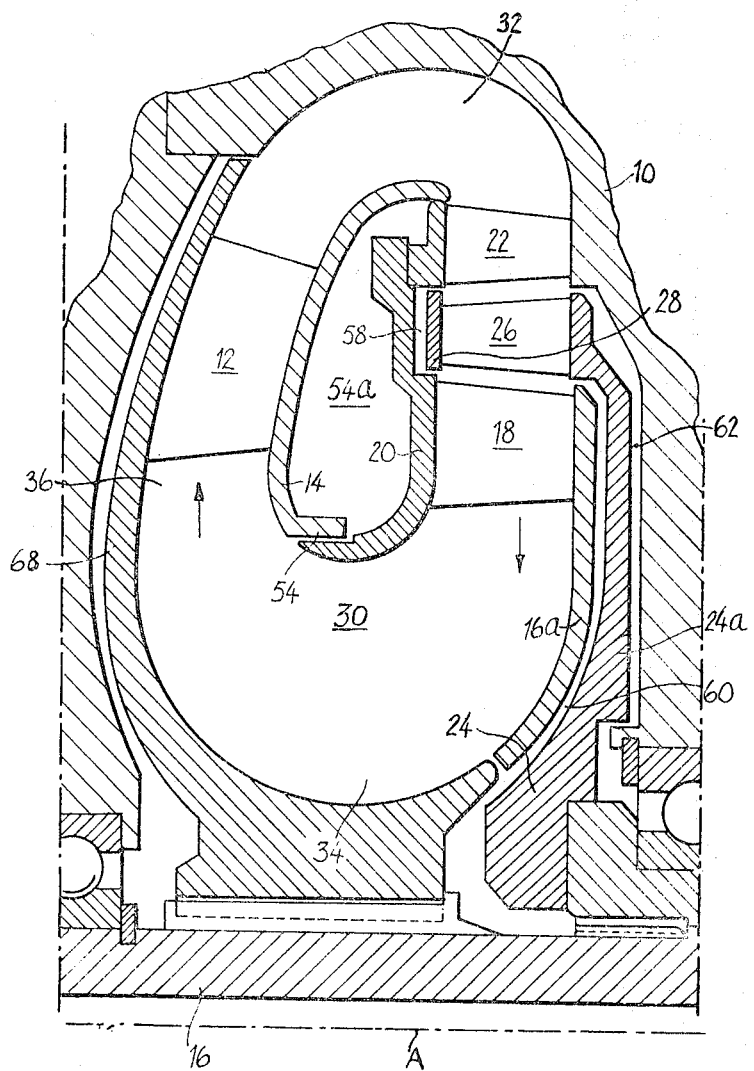
Figure 12:
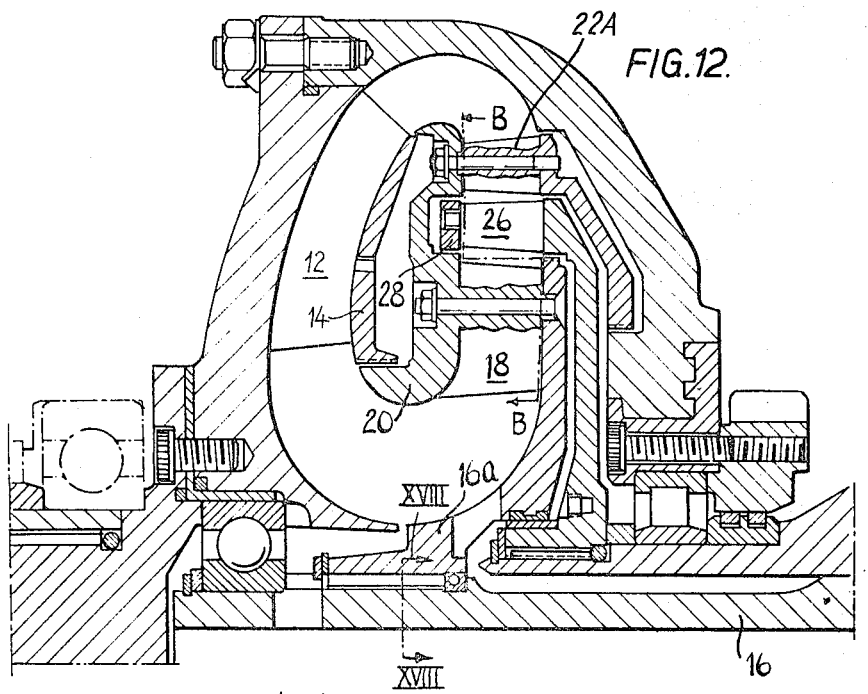
Figure 13:
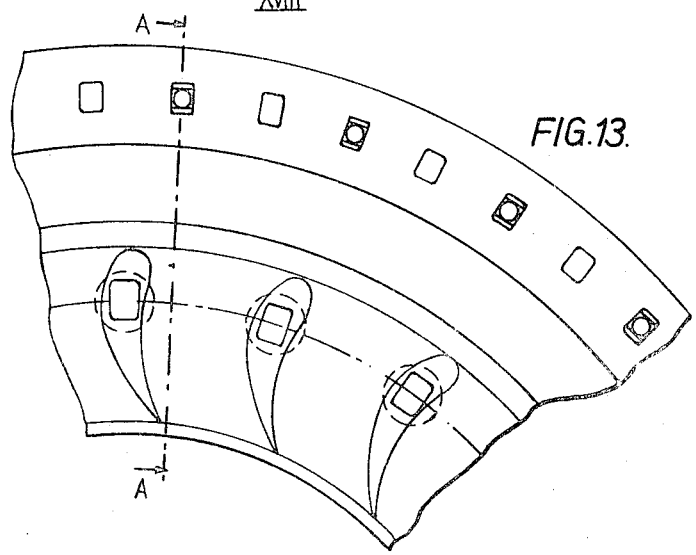
FIG. 13 is an external view of a core element which carries first and second stage rings of turbine blades.

From FIG. 1 several characteristics are to be noted which are of importance in attaining the results afforded by the invention. It will be seen, for example, that the blades are principally two-dimensional, that is they are only tapered in one direction in an amount which advantageously allows suitable casting process to be used. A centrifugal pump/centripetal turbine type arrangement is used thereby leaving the outlet and inlet radii of the pump free to be made to different sizes so as to vary the torque absorption of the pump and to fit the inlet portion. Similar arrangements having the same features from manufacturing standpoint are shown in the FIGS. 10, 11 and 12 in which parts corresponding to parts in FIG. 1 are referred to by the same reference numerals used in FIG. 1. In FIG. 11, an additional arcuately sectioned disc 68 carries the ring of pump blades 12.

Referring now to FIGS. 2 to 5 and 6 to 9 which illustrate blading embodying certain of the novel features of the invention. In these figures, $\alpha$ indicates the outlets or discharge angles of the several blades and $b$ the minimum distance between adjacent blades of the same ring or, in other words, the narrowest or throat portion of the flow channel between the blades. The outlet angle $\alpha$ is shown as that angle occurring between a line XY (which passes through the outlet edge of a blade and which is a tangent to an arc of radius $b$ struck from the outlet edge of the adjacent blade at a pitch $p$ therefrom) and a tangent drawn at the outlet edge of the first mentioned blade to the circle containing the outlet edges.

In FIGS. 3 to 5 the relative inlet angle of the fluid entering the guide and the turbine blade rings at stall point, that is, with the impeller turning and the turbine stationary, is indicated by the arrow I$st$, whereas arrows I$sh$ indicate the direction of the relative inlet velocity at the shift point. The angle of divergence between these two conditions which mark the limits of the normally used range of the converter, is denoted by $\gamma$. The optimum relative inlet angle is represented by I$o$.

Figure 9:
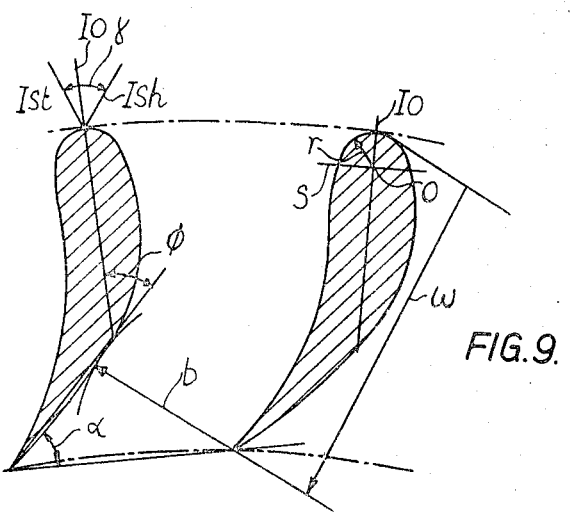

In FIGS. 5 and 9 the radius of the substantially radially nosed blades is designated $r$ although these nose portions may deviate from exact circular arcs whilst retaining a generally arcuate form with respect to centre $o$. The nose portions are those portions of the blades on the inlet side of a line $s$ drawn perpendicularly to the optimum relative inlet angle I$o$ and through the centre $o$. Further, the width of the blades is designated $w$ and the length is designated $l$—see FIG. 1.

Figure 7:
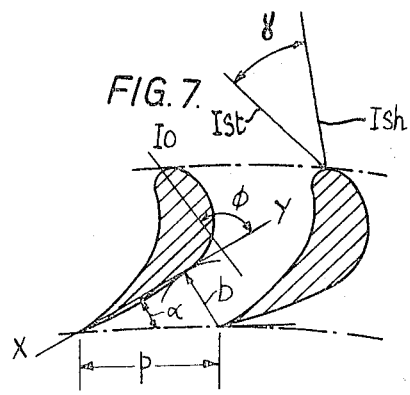
Figure 8:
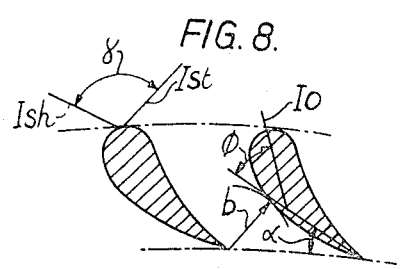
Figure 6:
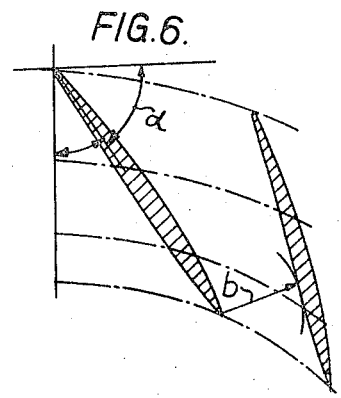

By comparing FIGS. 3, 4 and 5 with FIGS. 6, 7 and 8, it will be observed that an angle of deviation between the most favourable inlet and outlet direction for the FIGS. 3 and 7 are different, whereas this value remains nearly unchanged for the FIGS. 4 and 8 and 5 and 9 although the value of $\alpha$ is increased. In the FIG. 6 (as is normal for an increased Ms), the outlet edge radius is increased and/or the value of $\alpha$ is increased. Simultaneously the inlet portion of the pump (FIG. 6) is modified for a higher quantity of fluid circulation. The following table indicates the combinations of values $\alpha$ and $\phi$ for the high and low Ms field on the turbine side, where $\phi$ is the angle of deviation between the centre lines of leading and trailing edges of the blades.

|  | Low Ms range 40-80 | | | | High Ms range up to 140 | | | |
| --- | --- | --- | --- | --- | --- | --- | --- | --- |
|  | φ | | α | | φ | | α | |
|  | Min. | Max. | Min. | Max. | Min. | Max. | Min. | Max. |
| 1st turbine stage | 50 | 90 | 22 | 28 | 75 | 115 | 29 | 38 |
| Guide stage | 25 | 50 | 28 | 38 | 25 | 50 | 32 | 41 |
| 2nd turbine stage | 40 | 65 | 48 | 58 | 40 | 65 | 50 | 62 |

It is further to be observed from the FIGS. 3 and 7 that as the Ms factor increases, the value of γ decreases. Further, the mean inlet direction is changed and is utilised to modify the blade profile in such a way that not only the angle of deviation φ, but also the ratio between the nose radius and the size of the profile for the first turbine becomes higher than for the normal Ms field. For the low range (Ms 40-80) a relationship $r/w$ between the nose radius $r$ to the width $w$ of the blades has usually been 11%. However, for the high range (Ms 80-140) the relationship $r/w$ must be increased to between 13-14%, at the same time as the height of the blades in relation to the width $w$ is increased from 35% to about 45%, and the φ value, on average, has increased from about 70% to about 95%. By height of the blades is meant the maximum transverse dimension of the blades measured at right angles to the width $w$.

By modifying the blade profile in this way, it is possible to increase the pump head of the pump part and still retain a balance between the loss fields for the different stages, and even to lower the losses in the first stage, despite the fact that the first stage in the high Ms field is absorbing proportionally higher portion of the energy and to compensate partly for increased so called ventilation losses.

The tapered blade form, shown in FIGS. 1, 10, 11 and 12 improves guidance of the fluid and, at the same time, it allows the blades to be cast together with the rings in a die using die-casting techniques. Such techniques further simplify and reduce machining required for fastening the different elements to each other. A suitable angle of tapering is for the heavy part of the blade 1°. For the thin part of the blade it can be reduced to 0.5°.

It has been shown earlier in this specification how the Ms range of a blade system has been extended and also that this type of blade system with principally two-dimensional blades can be made tapered as shown on FIGS. 1, 10, 11 and 12. The increase in Ms range obtained has not reduced the efficiency but has, on the contrary and unexpectedly, increased the obtainable efficiency. To this end, it is preferable to be able to assemble the blade system from components which require no or practically no machining and this is achieved by giving the connection the form shown on FIGS. 13, 14, 15, 16 and 17.

In these figures, it will be seen that the discs and the blades are formed with rectangular sectioned projections 18A (FIG. 16) and rectangular holes 16E (FIG. 16) or recesses respectively and, when viewed radially, the clearance is relatively large. On the other hand, the clearance measured in a peripheral direction between co-operating and parallel faces of the projections and holes is such as to give a sliding clearance. The function of this system is that diametrically positioned pairs of projections and holes determine the position of the elements in relation to each other at right angles to the line through the diametrically positioned projections and the holes. In other words, two pairs of projections and holes disposed at 90° to each other determine the relative position of the rings and this is only influenced by the necessary tolerance over the width of the projections and the width of the holes or recesses (that is, the peripheral clearance) thereby eliminating substantially completely any deviation from the theoretical shape between diametrically positioned holes and projections so as to centralise the elements. With this system, the pump 12 and its side ring 14 (see FIG. 12) and the guide blade 26 and its side ring 28 are riveted or welded together at their free ends to form a fixed assembly. However, it is possible to dismantle the first turbine and the second turbine—see FIG. 12—and, therefore, the first turbine includes an integrally cast screw 22A, and the second turbine has a "through-going" screw, determining the axial position between the elements, whereas the projections and holes as described before determine the concentric and angular positions of the parts.

The problem of adapting the die cast method for the parts of a blade system also assists in providing a solution to the problem of fastening the the turbine and guide parts to the appropriate shafts without using expensive methods. The problem although similar to that for fixing the rings to each other as described above, has the difference that shrinkage of the parts when casting is represented by the different thermal expansions occurring when, for example, an aluminium hub part is fastened onto a steel shaft and, in these circumstances, it is not reasonable to use shrink-mounting techniques nor from an economic standpoint is it practical to use cast-linings.

FIG. 18 shows how a spline connection between an aluminium outer ring or hub 16a and a steel shaft 16 can be made to practically eliminate the influence of the relative thermal expansions of the outer ring 16a and the shaft. The low strength of the material with higher elongation is compensated by making the diameter of the shaft (steel) and the diameter of the hub (aluminium) bear a relation to the strength figures for the two materials as well as to the number of splines selected in order to make the connecting surfaces compensate for the material with the lower strength. The side surfaces of the splines 16b, 16c (FIG. 18) are contained in radial planes or planes parallel to radial planes. The peripheral width $a$ and $b$ of the splines (FIG. 18) and the radial height of the splines are chosen so that, having regard to the strengths of the respective materials from which the hub and outer ring are made, the splines on the shaft and the splines on the hub are equally strong.

It is well known that even a small modification of a blade profile in a system can result in a high loss in efficiency, especially in stall torque ratio. The shape of the torus is also very important when seeking to obtain good performance, as well as the positioning of the blade rings in the circuit. The clearances between the rings must also be carefully taken into consideration. Thus, a large number of factors influence the possibility to achieve a single blade system, giving good performance. To develop a system which, in addition to giving good performance, is cheap to manufacture, has been the aim of torque converter manufacturers since the Lysholm/Smith transmission was introduced in the early nineteen thirties and to date the market shows that known solutions have been limited to compromises and cheapness of manufacture has always resulted in poor performance.

Although existing literature quite correctly indicates a favourable relationship between size of transmission and so-called specific torque absorption Ms, the present invention renders possible, for a certain size of transmission, modification of the blade system to obtain a very wide range of Ms whilst still obtaining a very high performance. At the same time the transmission includes structural features which improve efficiency and simultaneously enable a manufacturer to use production techniques which permit reproduction of the structure accurately so that the performance obtained from a test unit is also obtained from a standard production unit. This is not normally the case with currently available transmissions. The variation of efficiency between production transmission units including a torque converter of the present invention is kept within 1% whereas normally in currently available transmissions the field of variation is up to 5%. Thus, the present invention achieves a high performance and adaptability for all production units and, at the same time, reduces production costs. Performance-wise, the invention provides an increased stall torque ratio by, on average 30%, when considered over the whole Ms range and, at the same time as the Ms range has been widened to Ms 140 an increased efficiency obtained. As to adaptability the Ms range is therefore practically doubled. Further, the features mentioned above are reproducible in all production units and because die-casting techniques can now be used, the cost of the units is reduced by up to 50%. Thus the results achieved present a high technical advance over currently available transmission units. It will be appreciated from the foregoing that a variation of one or more of the features of the invention will result in a considerable loss of performance thereby indicating the narrow limits within which a designer must operate to achieve the desired results and how these results depend upon the combination of the structural features described above.

Figure 19:
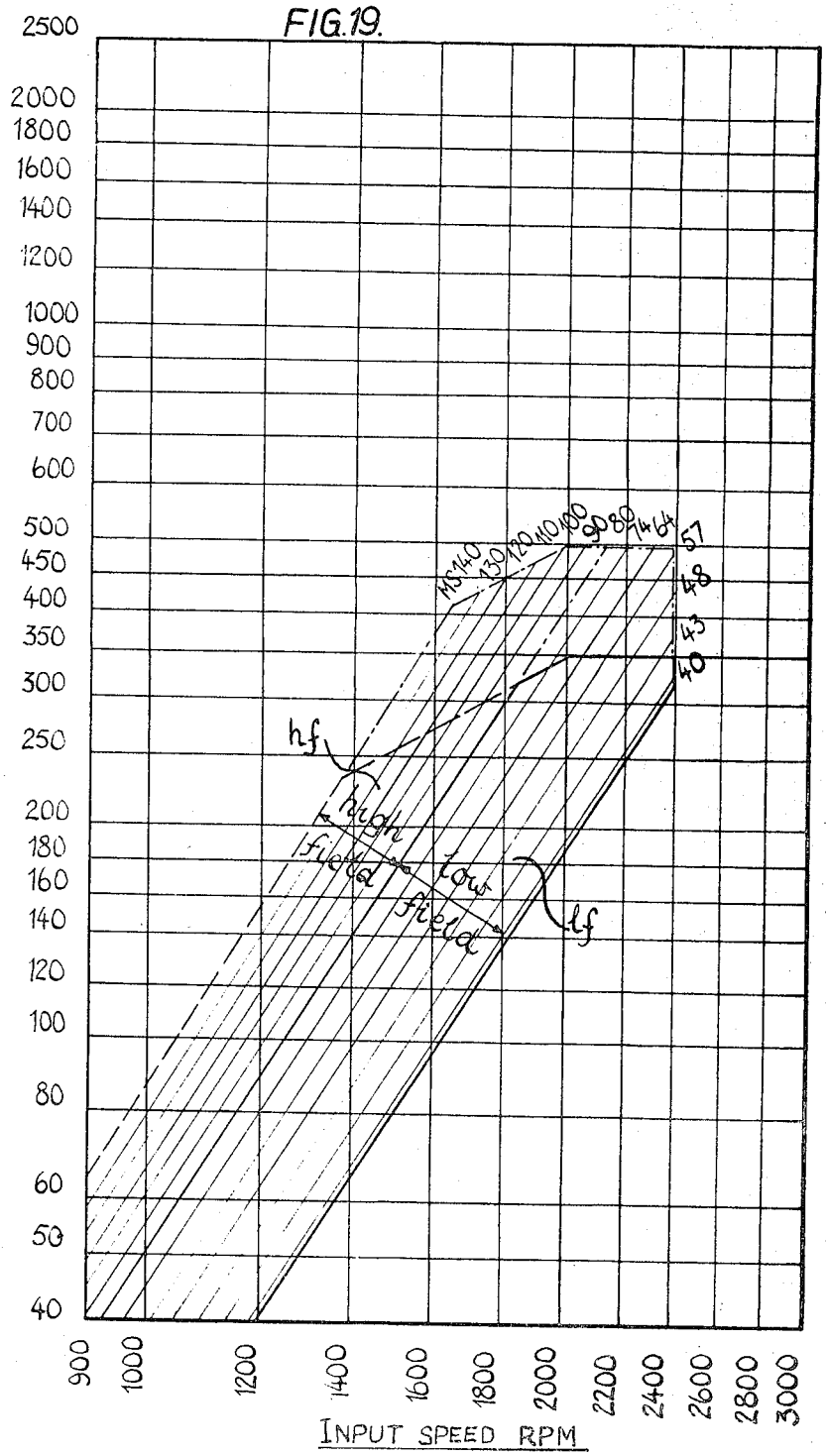
FIG. 19 shows the range for the high and low Ms field for a transmission.

FIG. 19 shows an extension of the Ms field as previously described and indicates how the invention makes it possible to use one basic blade system for a range of engine sizes when the transmission including a torque converter according to the invention is directly driven by the engine without intermediate gears.

FIG. 20 shows the performance curves of efficiency of the torque converter system (output power/input power×100) obtainable for the low Ms range or field $lf$ and the high Ms range or field $hf$ From these curves it will be seen that the ratio of $n_2/n_1$ at the shift point for the high Ms range is greater than that for the low Ms range. At the same time the efficiency for the high Ms range has been increased and these results compete very favourably with the results obtained for a three-stage torque converter designed for one particular Ms value.

What I claim is:

1. A hydrodynamic torque converter having a closed hydraulic circuit disposed about an axis and comprising a ring of pump blades positioned in the outflow section of the hydraulic circuit through which liquid flows radially outwardly relative to said axis, and including a blade system in the inflow section of the hydraulic circuit through which the hydraulic liquid flows radially inwardly relative to said axis, said system comprising first and second rings of turbine blades and a ring of guide blades disposed between the first and second ring of turbine blades, and wherein the angle $\phi$ for the blades of the first turbine ring is between 50° and 90° for a low Ms range of 40 to 80 and between 75° and 115° for a high Ms range up to 140 and wherein the angle $\phi$ for the guide ring is between 25° and 50° for the said low and the said high Ms ranges and angle $\phi$ for the second turbine ring is between 40° and 65° for the said low and the said high Ms ranges, wherein the angle $\phi$ is defined as the angle of deviation between the leading and trailing edges of the blades, and wherein Ms is defined as the specific torque for a given size torque converter operating at a given speed.

2. A torque converter according to claim 1 wherein the cross-sections of each blade, taken in a direction perpendicular to the length of the blade are of the same shape along the length of the blade.

3. A torque converter according to claim 2 wherein the blades of at least one ring are tapered by an angle of 0.5° to 1.5°, the said angle being contained between a generatrix of the blade profile and a line which is parallel to the blade axis and which intersects the generatrix at a point on the blade surface.

4. A hydrodynamic torque converter having a closed hydraulic circuit disposed about an axis and comprising a ring of pump blades positioned in the outflow section of the hydraulic circuit through which liquid flows radially outwardly relative to said axis, and including a blade system in the inflow section of the hydraulic circuit through which liquid flows radially inwardly relative to said axis, said system comprising first and second rings of turbine blades and a ring of guide blades disposed between the first and second ring of turbine blades wherein the cross-sections of each blade taken in a direction perpendicular to the length of the blade, are of the same shape along the length of the blade and have the same angular orientation relative to the axis of the blade, and wherein the surfaces of the blades are tapered by an angle of between 0.5° and 1.5°, the said angle being contained between a generatrix of the blade profile and a line which is parallel to the blade axis and which intersects the generatrix at a point on the blade surface.

5. A torque converter according to claim 4, wherein the ratio $r/w$ for the first said ring of turbine blades is higher for the said high Ms range than is the corresponding ratio for the said low Ms range, wherein $r$ is defined as the radius of curvature of the blades at their inlet ends and $w$ is defined as the width of the blades from the inlet edges to the outlet edges.

6. A torque converter according to claim 4, wherein that part of each blade in the region of the leading edge thereof is tapered within the range between 1.0° and 1.5° and that part of the blade in the region of the trailing edge thereof is tapered within the range between 0.5° and 1.0°.

7. A torque converter according to claim 1 wherein the ratio $r/w$ for the first said ring of turbine blades is higher for the said high Ms range than is the corresponding ratio for the said low Ms range, wherein $r$ is defined as the radius of curvature of the blades at their inlet ends and $w$ is defined as the width of the blades from the inlet edges to the outlet edges.

8. A torque converter according to claim 1, wherein for the said low Ms range the inlet edges of the pump blades are located on a smaller radius relative to said axis than the said second turbine ring outlet edges and wherein for the said high Ms range the inlet of the pump blades are located on a larger radius relative to the said axis than the said second turbine ring outlet edges.

9. A torque converter according to claim 1, wherein in the said low Ms range $\alpha$ for blades of the first turbine ring, the guide ring and the second turbine ring are within the ranges of 22° to 28°, 28° to 38°, and 48° to 58°, respectively, and in the said high Ms range, $\alpha$ for the blades of the first turbine, the guide ring and the second turbine ring are within the ranges of 29° to 38°, 32° to 41°, and 50° to 62° respectively, wherein $\alpha$ is defined as the discharge angle of the blades between the tangent from the oulet edge of the blade to the arc with a radius drawn from the outlet edge of the adjacent blade and a chord from the outlet edge of the said blade to the outlet edge of the said adjacent blade.

10. A torque converter according to claim 1, wherein the blades of at least one ring are formed integrally with the ring.

11. A torque converter according to claim 10, wherein the blades of the first turbine ring are formed integrally with either one of a ring member or a disc member and are tapered with their smaller ends disposed adjacent an inner core member and the blades of the guide ring are formed integrally with a hub member and tapered with their smaller ends disposed adjacent the inner core member and wherein the blades of the second turbine ring are formed integrally with the said inner core member and tapered with the smallest ends thereof disposed remote from the inner core member.

12. A torque converter according to claim 11 wherein the blades, and the associated member with which the blades are integral, are formed by diecasting.

13. A torque converter according to claim 12, in which the free ends of the blades of at least one ring are concentrically guided in one of said disc ring or inner core members by projections having one pair of parallel faces located in recesses in said member having a co-operating pair of parallel faces, the said parallel faces being disposed either in substantially radial planes or in planes substantially parallel to radial planes.

14. A torque converter according to claim 13, including a relatively large radial clearance between the projections and the recesses, whereby centering of a ring of blades in its associated core, ring or disc-member, is made independent of variations in size between parts, which are pressured die-cast in the same tool.

15. A torque converter according to claim 13, wherein the clearance between the said faces on the appropriate projection and the recesses is a sliding clearance.

16. A torque converter according to claim 10 in which a screw is cast into the blade for bolting it to its appropriate ring member.

17. A torque converter according to claim 16, wherein two side rings are screwed together with screws passing through holes in the associated blades and in which the blades are cast integrally with one of the side rings, the relation between the active surface area of the head and/or the nut relative to the thread section of the screw being such that the screw thread yields before the material below the head or the nut yields.

18. A torque converter according to claim 16 in which one of the turbine hub or the guide blade hub is fastened to a shaft through a parallel sided spline connection, and in which the radial height of the splines in relation to the peripheral width of the splines is such that the spline on the shaft and the spline on the hub are of equal strength.

19. A torque converter according to claim 18 in which the shaft splines of the spline connection between the shaft and the hub have a radial height in relation to their peripheral width and the hub splines have a radial height in relation to their peripheral width such that the splines are equally strong with respect to the shear strength of the materials from which the said shaft and the hub are made.

20. A torque converter according to claim 19, wherein the shaft is steel and the hub is aluminum and the peripheral width of the splines on the hub is larger in relation to its height than are the splines on the shaft.

References Cited

UNITED STATES PATENTS

| | | | |
|---|---|---|---|
| 2,690,054 | 9/1954 | Ahlen | 60—54 |
| 3,071,928 | 1/1963 | Dundore et al. | 60—54 |
| 3,154,924 | 11/1964 | Kronogard | 60—54 |

EDGAR W. GEOGHEGAN, Primary Examiner